March 23, 1965

G. B. LUKENS II 3,174,367

CONTROL SYSTEM

Filed July 31, 1962

INVENTOR:
GEORGE B. LUKENS II,

BY *James J. Williams*
HIS ATTORNEY.

INVENTOR:
GEORGE B. LUKENS II,
BY James G. Williams
HIS ATTORNEY.

INVENTOR:
GEORGE B. LUKENS II,
BY james g. Williams
HIS ATTORNEY.

United States Patent Office 3,174,367
Patented Mar. 23, 1965

3,174,367
CONTROL SYSTEM
George B. Lukens II, Waynesboro, Va., assignor to
General Electric Company, a corporation of New York
Filed July 31, 1962, Ser. No. 213,759
14 Claims. (Cl. 82—5)

The invention relates to a control system, and particularly to a control system for synchronizing the relative movement of a machine tool and a rotating workpiece. More particularly, the invention relates to a control system for cutting threads on a rotating workpiece in a lathe.

Machine tool control systems have presently advanced to the state where positioning and contouring functions in three dimensions, and additional functions as well, can be performed by the machine tool in response to the control system. One such control system is the numerical contouring control system in which numerical information indicative of the desired function or functions is applied to the system. A numerical control system for contouring and associated functions is described and illustrated in a copending application entitled "Automatic Control Apparatus," filed by L. U. C. Kelling on September 5, 1961, and having Serial No. 136,420.

The present invention is related to one of the associated functions of such a numerical contouring control in that it provides means for synchronizing the movement of the machine tool with the rotation of the workpiece so that threads or spirals may be cut on the workpiece. Thus, one of the objects of the invention is to provide an improved numerical contouring system.

Another object of the invention is to provide a numerical contouring control system with means to cause a machine tool to cut threads.

Another object of the invention is to provide an improved numerical contouring control system which can be used with a lathe for removing material at a constant rate or at a constant thickness.

Another object of the invention is to provide an improved numerical contouring control system which can be used with a lathe for cutting threads.

Another object of the invention is to provide an improved numerical contouring system which can accurately control a lathe for cutting threads and which can accurately control a lathe for retracing the same thread.

Another object of the invention is to provide an improved numerical contouring system which can control a lathe for cutting threads of varying leads, or threads of varying diameters, or threads of both varying leads and diameters.

Briefly, these and other objects of the invention are attained by the use of the invention with a numerical contouring control system which provides pulses from a system generator. These pulses are supplied to a velocity command device which, in response to input information, modifies the rate of the pulses so that they indicate the desired speed of movement of the machine tool. After this velocity modification, the pulses are supplied to a function generator which, in response to input information, resolves the pulses into one or more components which indicate one or more directions of movement of the machine tool. Each component of the pulses may be applied to a counter which, in response to input information, controls the number of pulses, the number indicating the distance of movement of the machine tool. Thus the pulses which do reach the servo or operating portion of the control system indicate machine tool velocity by their rate and indicate machine tool distance by their number or quantity. There are one or more components of these pulses, each component representing a direction of movement of the machine tool.

The invention provides a lathe pulse generator which produces pulses at a rate proportional to the rotational speed of the workpiece. When threads are to be cut, the pulses from the system generator are removed from the velocity command device, and the lathe pulses are applied to the velocity command device and to the function generator. For threads of constant lead, the function generator receives only those lathe pulses applied directly to it, and movement of the lathe cutting tool is synchronized to the rotational speed of the workpiece. For threads of varying lead, the lathe pulses applied to the velocity command device are utilized in the function generator in accordance with the lead rate input information to provide an increased or decreased pulse rate, and therefore an increased or decreased thread lead. In addition, threads or varying diameters may be cut by appropriate control of another component of the pulses.

The invention may be better understood from the following description given in connection with the accompanying drawings, and the scope of the invention will be pointed out in the claims. In the drawing:

*Numerical contouring control system—background*

Figure 1:
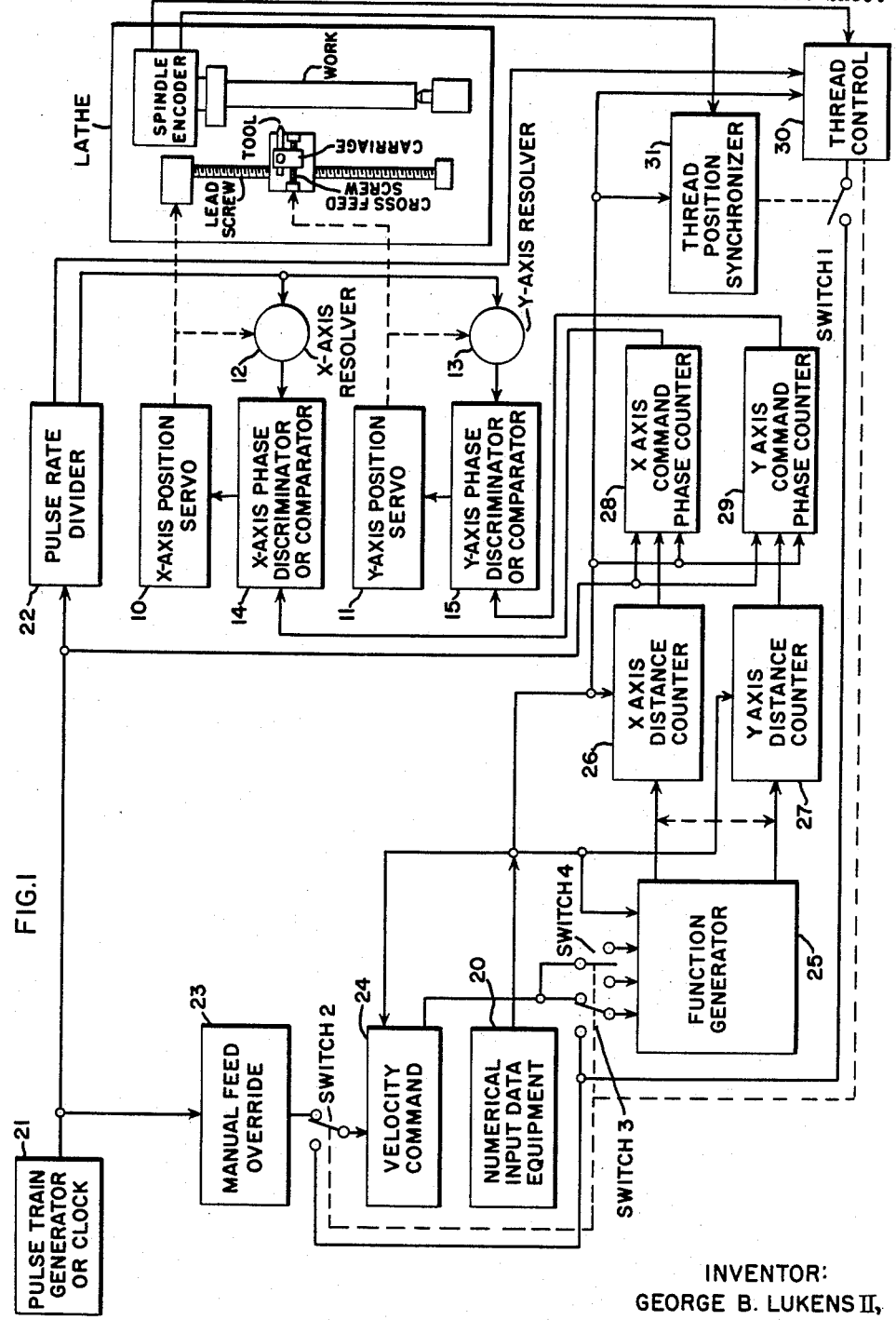
FIGURE 1 shows a block diagram of a numerical contouring control system and the thread cutting control of the invention as used with a lathe.

FIGURE 1 shows a block diagram of a numerical contouring control system and the thread cutting control of the invention as used with a lathe. The system shown in FIGURE 1 contemplates an X axis and a Y axis of motion. More or less axes of motion may be provided. The system shown in FIGURE 1 includes three broad sections: the lathe, the servo or operating portion, and the electronic control portion. The lathe shown is intended to be typical, and includes a headstock and chuck for holding and rotating a workpiece, and a tailstock for further supporting the workpiece. A lathe carriage carrying a tool may be moved in two directions, these being designated the X axis and the Y axis. Motion along the X axis is provided by the lead screw, and motion along the Y axis is provided by the cross-feed screw. An encoder is coupled to the lathe spindle. This encoder may be one of a number of known devices for providing digital signals at a rate indicative of the rotational speed of the spindle and workpiece. A rotational indicator is also coupled to the spindle to provide a signal indicative of a particular position of the spindle or workpiece.

The servo or operating portion of the system drives the lead screw and the cross-feed screw of the lathe by an X axis position servo 10 and a Y axis position servo 11 as indicated by the dashed lines. The X axis and the Y axis position servos 10, 11 likewise drive respective position feedback devices such as resolvers 12, 13. These resolvers 12, 13 are known in the art, and if suitably excited provide a voltage at their outputs whose phase is a function of the mechanical angular position of the resolver. Thus, the resolvers provide position feedback signals. These position feedback signals are coupled to phase discriminators or comparators 14, 15 respectively. The comparators 14, 15 compare the actual position of the lathe tool (as indicated by the resolvers 12, 13) with the commanded position (as called for by the control portion of the system). This comparison is made on a phase basis, and any difference in phase between the commanded signal and the feedback signal represents the difference between the commanded position and the actual position. This difference is utilized to produce an error signal which is fed into the position servos 10, 11. The servos 10, 11 drive the lead screw and the cross-feed screw respectively to effect or bring about positioning in accordance with the command.

The control portion of the system includes numerical input data equipment 20 which accepts numerical command information. This information may be on a punched tape, a punched card, or a magnetic tape digital input device. The input data equipment 20 reads the commanded information or instructions and the commanded addresses, and generates appropriate electrical signals for controlling the machine tool or lathe. Typically, the numerical input information is in a coded digital form related to the speed at which the lathe tool is to travel, and further is in a form related to the distance the lathe tool is to travel along the X and Y axes. The instructions from the input data equipment 20 are coupled to various elements or portions of the control portion of the system.

The system utilizes a pulse train generator or clock 21 that provides pulses by which the commanded information is transported and indicated in the control portion of the system. The clock 21 also provides a reference pulse rate input to the resolvers 12, 13 and other elements, after being suitably divided to a lower frequency by a pulse rate divider 22. At appropriate places in the control portion of the system, the rate of the pulses originally produced by the clock 21 determines the resultant velocity of the tool of the lathe, and the quantity or number of the pulses determines the distance traveled by the tool of the lathe. The pulses from the clock 21 are fed to a manual feed override 23 which enables an operator to vary the rate of pulses produced at the output of the manual feed override 23 and hence to control the speed of travel of the lathe tool. Pulses from the manual feed override 23 are supplied through a switch 2 to a velocity command 24. The velocity command 24 varies the rate of pulses produced at its output as indicated or called for by the commanded information. After the pulse rate is modified by the velocity command 24, the pulses are supplied through a switch 3 to a function generator 25.

The function generator 25 resolves the pulses received into one or more components indicative of the movements the lathe tool is to follow along one or more axes of motion. In addition, the function generator 25 may modify these pulses so that the lathe tool follows a circular motion or some particular motion. The function generator 25 makes this resolution or modification in response to the commanded information from the input data equipment 20. The function generator 25 produces two sets of output pulses. One set of pulses is designated up pulses because its input information is stored in up counters which may have their numbers increased by normal counting methods. The other set of pulses is designated down pulses because its input information is stored in down counters which may have their numbers decreased by normal counting methods. Each of these sets may be applied to either an X axis distance counter 26 or to a Y axis distance counter 27 in either sense so as to permit any motion of the lathe tool. This feature is indicated by the dashed line between the output leads of the function generator 25.

The distance counters 26, 27 are supplied with commanded information from the input data equipment 20. This information indicates the number of pulses to be supplied along each respective axis of motion, and therefore indicates the distance to be traveled along each such axis of motion. The distance counters 26, 27 count the pulses supplied thereto by the function generator 25, and when the commanded number of pulses has been counted, the distance counters 26, 27 prevent further pulses from flowing through the distance counters 26, 27 to respective command phase counters 28, 29. For some commanded information, the distance counters 26, 27 are not utilized, and pulses from the function generator 25 are supplied directly to the command phase counters 28, 29.

The command phase counters 28, 29 are also supplied with commanded information from the input data equipment 20 and with pulses from the clock 21. If no pulses are supplied to the phase counters 28, 29 from the distance counters 26, 27 or from the function generator 25, the phase counters 28, 29 provide outputs which have the same pulse rate as the resolvers 12, 13. However, if pulses are supplied to the phase counters 28, 29 from the distance counters 26, 27 or from the function generator 25, the phase counters 28, 29 count these pulses. If the direction of motion called for is in a positive direction, the counted pulses are added to the clock pulses, but if the direction of motion is in the negative direction, the counted pulses are subtracted from the clock pulses. The addition or subtraction of pulses by the command phase counters 28, 29 has the effect of advancing or retarding the phase of the pulses produced by the counters 28, 29. And, this advanced or retarded phase is compared by the comparators 14, 15 with the resolver signals. The comparators 14, 15 provide an error signal indicative of these relative phases and supply this error signal to their respective position servos 10, 11. When no pulses are supplied to the phase counters 28, 29, the phase of the pulses supplied by phase counters 28, 29 is constant and in phase with the resolver signals and no error signal is provided. In the case where the distance counters 26, 27 are bypassed, an appropriate blocking signal is supplied by the function generator 25 when operation is to stop.

The system described thus far is known in the art, and therefore a further and detailed description of this system will not be given. In such known systems, a typical frequency of the clock 21 is 250 kilocycles per second, and a typical frequency for the resolvers 12, 13 is 250 cycles. These resolvers may be constructed so that a phase shift of 360 degrees is provided for each 0.1 inch of linear motion or for each one degree of rotary motion. Further, in such a system, each pulse supplied to the command phase counters 28, 29 results in 0.0001 inch of motion.

*Thread control—Brief description*

Presently, in order that threads can be cut on a lathe, it is necessary that the work and the lathe tool be coupled or geared together so that the tool moves the proper and desired distance for each revolution of the work. The tool is held on a carriage, and the carriage is moved by the lead screw. On manual lathes, a gear ratio is selected to couple the work and the lead screw, this ratio usually being calibrated in threads per inch. Threads per inch is another way of expressing the pitch of a thread. The number of threads per inch is equal to the reciprocal of the thread lead. Thus, four threads per inch is the same as a thread lead of 0.25 inch. When threads are being cut on a conventional lathe, the tool carriage is coupled to the lead screw mechanically, so that each time the work rotates one revolution the tool carriage moves a given distance determined by the selected gear ratio between the work and the lead screw. It is important, of course, that the tool carriage be coupled to the lead screw at the proper time with respect to the rotational position of the work so that the starting point of the thread may be properly determined and repeated. On a conventional lathe, this is achieved by the use of a threading dial with index numbers. The thread control of the invention replaces the mechanical gearing between the work and the lead screw with an appropriate control.

In order that the motion of the lathe tool can be synchronized with the rotational speed of the work, the invention utilizes a thread control 30 and a thread position synchronizer 31 as shown in FIGURE 1. The thread control 30 is provided with signals from a spindle encoder mounted on the lathe. In response to these signals, the thread control 30 produces pulses at some rate which indicates or which is proportional to the rotational speed of the work. The thread position synchronizer 31 is provided with a signal indicative of a particular rotational or angular position of the work. This signal permits the tool to be precisely positioned with respect to the work for retracing or following a previously cut thread. When threads are to be cut, the thread position synchronizer 31 closes switch 1 when the work is in the proper rotational position. The thread control 30 includes suitable circuitry which is responsive to commanded information from the input data equipment 20, and controls switches 2, 3, and 4 as indicated by the dashed line in FIGURE 1. When threads are to be cut, switch 2 is moved to the left so that the velocity command 24 is decoupled from the manual feed override 23 and coupled to switch 1. Likewise switch 3 is moved to the left so that the function generator is decoupled from the velocity command 24 and coupled to switch 1 also. With pulses provided by the thread control 30 from the spindle encoder, and with switch 1 closed and switch 3 moved to the left, the function generator 25 receives pulses which have a rate indicative of the rotational speed of the work. The velocity command 24 also receives the same pulses. However, for linear threads, the velocity command 24 is not utilized.

The thread control 30 is preferably arranged to produce 10,000 pulses for each revolution of the work. Since, as previously indicated, one such pulse applied to the command phase counters 28, 29 results in 0.0001 inch of motion, the pulses from the thread control 30 provide corresponding movement of the lead screw. Therefore, the movement of the lead screw is dependent on the rate of these pulses. If all pulses from the thread control 30 are applied to the counters 28, 29, then for each revolution of the work, the lead screw can be moved a maximum of 10,000 times 0.0001 inch, or 1.0 inch. This 1.0 inch is the maximum thread lead for the conditions selected, and is a good maximum because few threads have greater leads and because good accuracy can still be obtained with small thread leads. However, this is a matter of selection or choice. In order to attain leads of less than 1.0 inch, the function generator 25 may reduce the number of pulses applied to a given axis and thereby reduce the carriage travel for each revolution of the work. Thus, for threads having a lead of 0.25 inch, the function generator 25 would supply only 2,500 pulses for each revolution of the work. In this case, the tool carriage would travel 2,500 times 0.0001 or 0.25 inch per revolution of the work. It will thus be seen that substantially any thread lead may be achieved by appropriate operation of the function generator 25.

As mentioned, the signals from the function generator 25 may be supplied to either or to both axes of motion. Therefore, threads may be cut along the rotational axis of the work by supplying thread signals to the X axis portion, or transverse to the rotational axis of the work by supplying thread signal to the Y axis portion. If desired, the threads may be tapered (i.e., have a changing diameter) by supplying thread signals to the X axis portion and taper signals to the Y axis portion. In addition, threads of variable lead may be cut by the application of pulses supplied by the velocity command 24 through the switch 4 to the function generator 25. These pulses from the velocity command 24 are utilized within the function generator 25 to increase or decrease the otherwise constant rate of pulses produced by the function generator 25. Such a constant rate of pulses results in a constant thread lead, while an increasing or a decreasing rate of pulses results in an increasing or a decreasing thread lead. And finally, the varying thread diameter function and varying thread lead function may be combined so that substantially any sort of desired thread can be produced.

A detailed description of one embodiment of the thread control 30 and the thread position synchronizer 31 will be given hereinafter. But before this description is given, it is appropriate to consider in further detail, the velocity command 24 and the function generator 25.

*Velocity command and function generator*

Figure 2:
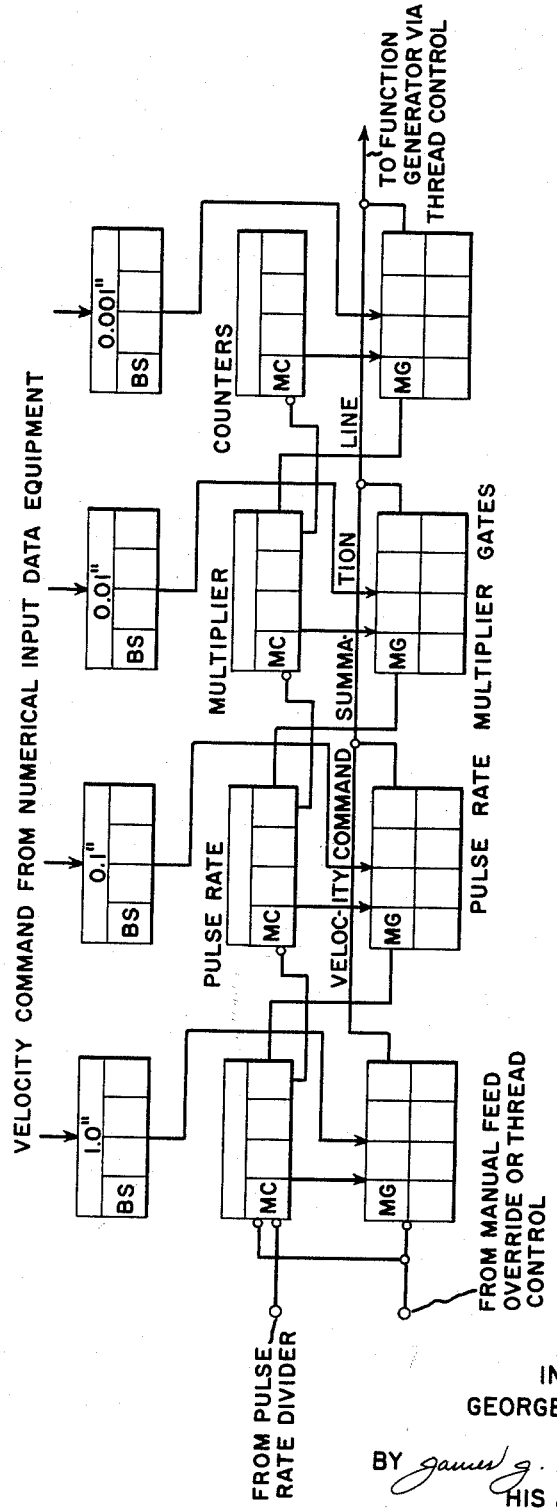
FIGURES 2 and 3 show further detailed block diagrams of a velocity command device and a function generator for explaining their relationship with the thread cutting control of the invention.
Figure 3:
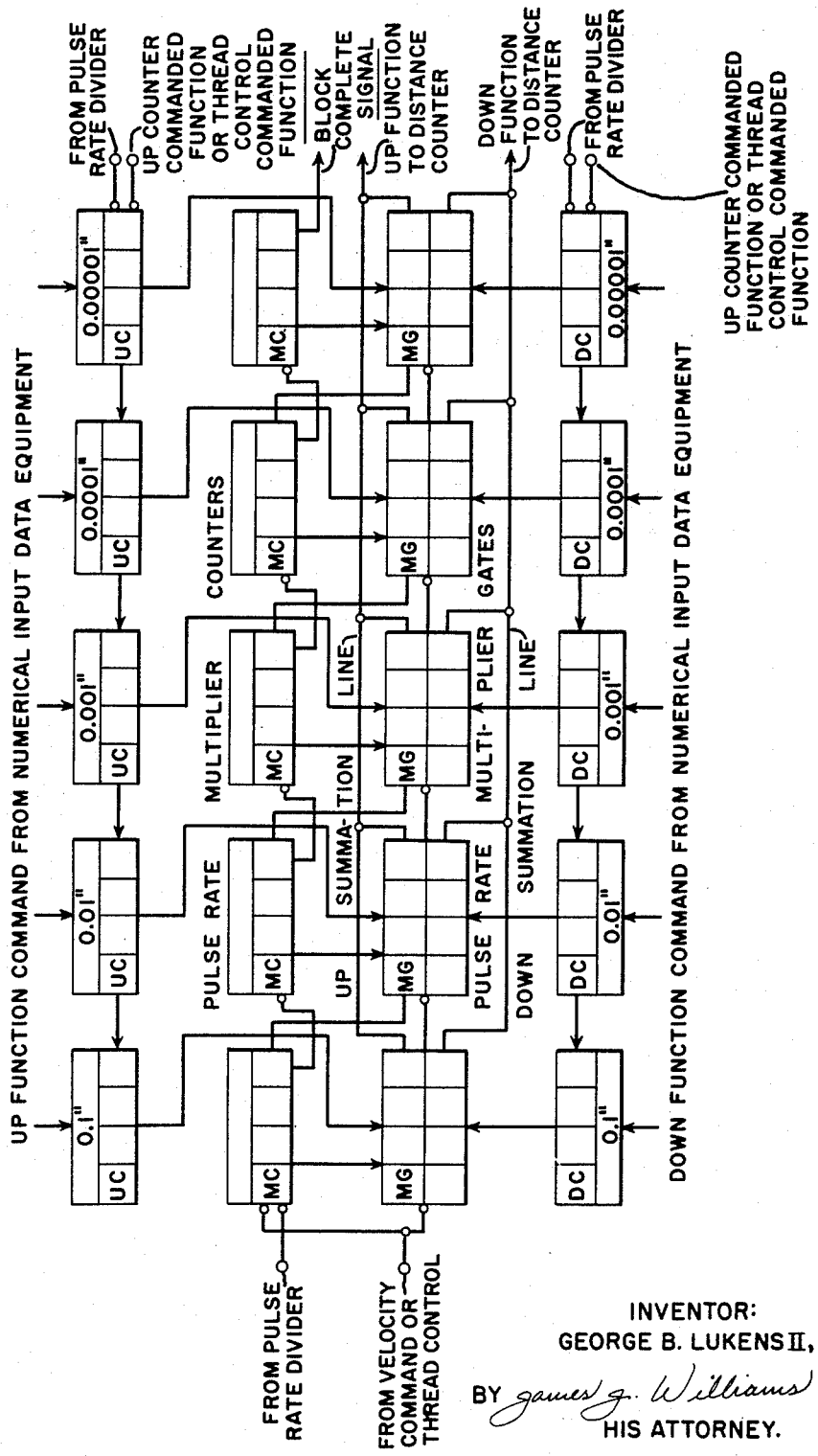

FIGURES 2 and 3 show block diagrams giving further details of the velocity command 24 and the function generator 25 shown in FIGURE 1.

The velocity command 24 lowers the incoming pulse rate from the manual feed override 23 by the proper amount so as to obtain an output pulse rate corresponding to the commanded velocity or commanded feed rate. Thus, the commanded velocity determines the extent to which the incoming pulse will be reduced by the velocity command 24. In FIGURE 2, pulses are supplied to the velocity command 24 from either the manual feed override 23 or from the thread control 30. These pulses are supplied to four stages of multiplier gates MG and also to the first stage of four pulse rate multiplier counters MC. The pulse rate multiplier counters MC also receive appropriate pulses from the clock 21 or pulse rate divider 22. The pulse rate multiplier counters MC each comprise four flip-flops which are appropriately weighted. These multiplier counters MC reduce the rate of the incoming pulses so as to provide pulses which represent the incoming pulses multiplied by some number less than one. The multiplier gates MG utilize the pulses so provided to produce the desired pulse rate. This desired pulse rate is controlled by the number stored in storage devices BS. The commanded information from the input data equipment 20 is supplied to the storage devices BS, each of which includes four flip-flops suitably weighted. These storage devices BS control the multiplication or pulse rate selected by the multiplier gates MG. The multiplier gates MG are made up of gates which are externally connected to the multiplier counters MC, and which can, for one decade, select any number from 0 through 9 out of every 10 pulses counted by the multiplier counters MC. Additional such decades provide additional number selection, i.e., any number from 0 through 99 out of every 100 pulses.

Output signals from the velocity command are derived on a velocity command summation line which is coupled to each of the multiplier gates MG. A signal or a pulse is produced on the summation line by the multiplier gates MG when an appropriate signal is supplied from the manual feed override 23 or from the thread control 30, and when the count in the multiplier counters MC is equal to the commanded velocity in the storage devices BS. These signals on the summation line are normally supplied directly to the function generator 25, and when the thread control 30 is used, these pulses are supplied to the function generator 25 through or via the thread control 30.

FIGURE 3 shows a block diagram of the function generator 25. The block diagram of FIGURE 3 has a construction and operation similar to the construction and operation of the block diagram of FIGURE 2. However, the function generator 25 not only multiplies the incoming pulse rate by a decimal number but also resolves the incoming pulses into its component parts in an up function signal and a down function signal. These up and down function signals are produced on up and down summation lines respectively when an appropriate velocity command or thread control signal is present. The up and down counters UC and DC receive their commanded information from the input data equipment 20. The up function signals and the down function signals may be applied to either the X axis distance counter 26 or the Y axis distance counter 27 so that contouring in all possible combinations of directions (i.e., in all quadrants) may be attained.

Thread control—description

Figure 4:
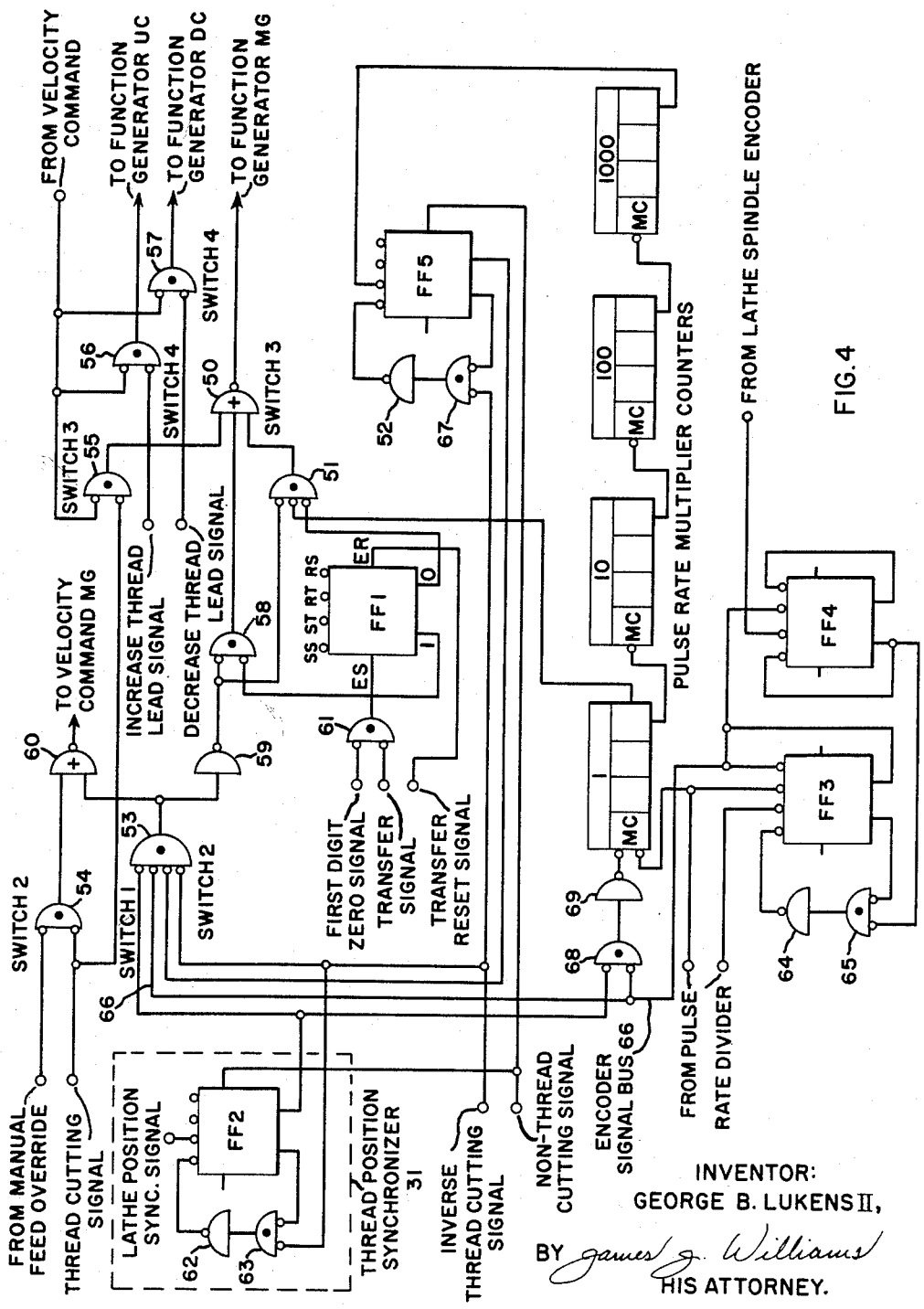
FIGURE 4 shows a schematic diagram of one embodiment of the thread cutting control of the invention.

FIGURE 4 shows a schematic diagram of one embodiment of the thread control 30 and the thread position synchronizer 31 in accordance with the invention. Although the diagram of FIGURE 4 utilizes logic circuitry to accomplish the functions of the thread control, the switches in FIGURE 1 are intended to indicate that various other known means may be utilized to accomplish the functions of the thread control. The logic elements shown in FIGURE 4 are known in the art, and are described in various publications, for example the book entitled "Design of Transistorized Circuits for Digital Computers," by A. I. Pressman, John F. Ryder Publisher, Inc., New York, 1960. FIGURE 4 shows five flip-flops FF1–FF5 which are similar to the flip-flop FF1. The flip-flop FF1 has its terminals labeled, and these include a set steering input SS, a set trigger input ST, a reset trigger input RT, a reset steering input RS, an electronic set ES, and an electronic reset ER. The outputs from the flip-flop FF1 are taken from its terminals 1 and 0. When a flip-flop is set, it is in the one state with its output terminal 1 at a logic 1 and its output terminal 0 at a logic 0. When a flip-flop is reset, it is in the zero state with its output terminal 1 at a logic 0 and its output terminal 0 at a logic 1. These flip-flops are generally described in the book mentioned at pages 278 through 307.

FIGURE 4 also shows a number of logic gates. Examples of these gates include two gates 50, 51. The logic gate 50 represents, in this application, a three input OR NOT gate (i.e., an OR gate with inversion at its output). This is sometimes called a NOR gate. In logic terms, the gate 51 also produces a logic 0 at its output if any one of three inputs are at a logic 1. The logic gate 51 represents, in this application, a three input NOT AND gate (i.e., an AND gate with inversion at each of its inputs). This is also sometimes called a NOR gate. In logic terms, the gate 51 also produces a logic 0 at its output if any one of its three inputs is at a logic 1. While the logic gates, 50, 51 selected for illustration happen to have three inputs, such gates may have a less or greater number of inputs. FIGURE 4 also shows inverters, such as the inverter 52. Such an inverter simply reverses the logic of an applied signal. If a logic 1 is applied to the input of the inverter 52, a logic 0 is produced at its output; and if a logic 0 is applied to the input of the inverter 52, a logic 1 is produced at its output. The operation of the various logic gates and inverters just described is explained in the book mentioned above at pages 114 through 144.

In FIGURE 4, the thread position synchronizer 31 is positioned at the upper left and is enclosed by dashed lines. The thread control 30 occupies the remainder of FIGURE 4. In FIGURE 4, the switches 1, 2, 3, and 4 of FIGURE 1 have been indicated alongside certain of the logic gates. In some instances, the switches 1, 2, 3, and 4 utilize more than one logic gate. Switch 1 utilizes one input of a four input NOR gate 53. Switch 2 utilizes a two input NOR gate 54 and the other inputs of the NOR gate 53. Switch 3 utilizes the three input NOR gate 50 and a two input NOR gate 55. Switch 4 utilizes a two input NOR gate 56 and a two input NOR gate 57. The NOR gate 56 is coupled to the up counters UC of the function generator, and the NOR gate 57 is coupled to the down counters DC of the function generator. A two input NOR gate 58 and an inverter 59 are coupled between the NOR gates 50, 53. A two input NOR gate 60 is coupled to the NOR gates 53, 54. The output of the NOR gate 60 is coupled to the velocity command multiplier gates MG.

The flip-flop FF1 is a zero shift flip-flop which recognizes commanded thread cutting lead numbers having a first significant digit of zero. The commanded numbers are applied to the flip-flop FF1 through a two input NOR gate 61. When a first digit of zero is commanded, the flip-flop FF1 blocks the NOR gate 58. Therefore the pulses must pass through the NOR gate 51, which they can do only when the NOR gate 51 is not blocked. The NOR gate 51 blocks nine out of ten encoder pulses, and thus in effect divides the encoder pulses by ten. This is done to increase the thread control accuracy by one significant number when the first commanded number is zero. In some instances, the desired number of threads per inch may result in a thread lead which is an irrational number. For example, 70 threads per inch is equivalent to a lead of 0.0142857 inch. Since a function generator with five decades can be programmed for leads between 0.00001 and 0.99999 inch, the thread lead must be rounded off to five places. In the example, the lead must be rounded off to 0.01429 inch, this resulting in an error of 0.0000057 inch (5.7 microinches) for each revolution of the work. For long fine threads, this error can mount up rapidly. In instances where fine linear threads are required and a zero occurs in the first digit, as in the example just mentioned, a zero shift can be made by dividing the encoder pulses by ten and shifting the digits one decade each in the function generator. Thus, in the example above, one more digit may be programmed to provide a thread lead of 0.014286. Thus, the error is reduced to 0.0000003 inch (0.3 microinch).

The flip-flop FF2 in the thread position synchronizer 31 is coupled with an inverter 62 and a two input NOR gate 63. The flip-flop FF2 provides a shaped pulse upon the occurrence of a predetermined rotational or angular position of the lathe spindle and work. This position may be indicated in any suitable fashion, such as by a magnetic element attached to the lathe spindle to produce a signal when this element passes by a predetermined point. This signal provides a reference location for beginning a thread cut, and therefore enables a thread to be accurately retraced if a second cut on a thread is needed.

Signals from the lathe spindle encoder are applied to synchronizing flip-flops FF3 and FF4 which are intercoupled through an inverter 64 and a two input NOR gate 65. Signals from the pulse rate divider are applied to these flip-flops FF3 and FF4 so that pulses are produced on an encoder signal bus 66. These pulses are synchronized with signals from the pulse rate divider. The encoder coupled to the spindle of the lathe may be any suitable device for generating pulses at a rate indicative of or proportional to the rotational speed of the lathe spindle and work. Such an encoder may be a digital tachometer utilizing magnetic components, capacitive components, or optical components. The pulses from the encoder, as well as the pulses from the pulse rate divider are so selected that 10,000 pulses are produced on the encoder signal bus 66 for each revolution of the lathe spindle and work.

The pulses on the bus 66 are applied through a two input NOR gate 68 and an inverter 69 to a four stage multiplier counter MC. The gate 68 is also coupled to the flip-flop FF2. The output of the 1 stage of the counter MC is coupled to the NOR gate 51 and blocks this gate 51 for nine out of ten pulses, but does not block this gate 51 for each tenth pulse. This is the zero shift feature previously mentioned. The output of the 1,000 stage of the counter MC is coupled to the flip-flop FF5 so as to set the flip-flop FF5 each time 10,000 pulses are counted. The flip-flop FF5 is coupled with the inverter 52 and a two input NOR gate 67, and is provided with an inverse thread cutting signal and a non-thread cutting signal. If thread cutting is desired, the flip-flop FF5 blocks the NOR gate 53 until a synchronizing signal is received and 10,000 pulses are counted by the counter MC so that thread cutting can always be begun or restarted at the proper position of the lathe spindle or work.

Thread control—Operation

The operation of the thread control will now be explained. If the contouring control system is in its contouring function or operation, switches 1, 2, 3, and 4 of FIGURE 1 are in the positions shown. A thread cutting signal is indicated by a logic 1, and an inverse thread cutting signal is indicated by a logic 0. A non-thread cutting signal is indicated by a logic 1. In FIGURE 4, the inverse thread cutting input for the gate 53 (switch 1) is at a logic 1 so that the gate 53 is blocked. Also in FIGURE 4, input for the gate 54 (switch 2) is at a logic 0 so that gate 54 is unblocked and pulses from the manual feed override may pass through the gate 54 and be applied to the gate 60. The gate 53 is blocked because an inverse thread cutting signal (logic 1) is applied to it. A logic 0 is applied from the output of the gate 53 to the gate 60. Thus pulses from the manual feed override may pass through the gates 54 and 60 to the velocity command multiplier gates MG. Pulses from the velocity command may pass through switch 3 (which comprises the two gates 55 and 50) to the function generator multiplier gates MG. The gate 55 is unblocked because a logic 0 is supplied by the thread cutting signal input. The gate 50 is unblocked because the output of the gate 53 is at a logic 0, which is inverted to a logic 1 and applied to the two gates 58, 51 so that the outputs of these gates 58, 51 are both at logic 0. Thus, switches 1, 2, and 3 are in the positions shown in FIGURE 1. The gates 56, 57 forming switch 4 are blocked by appropriate signals so that no pulses from the velocity command are applied to the function generator up and down counters UC and DC. Thus switch 4 is also in the position indicated in FIGURE 1.

When threads are to be cut, the thread cutting signal of logic 1 is applied to the two gates 54, 55. This blocks gate 54 (switch 2) and gate 55 (switch 3). The inverse thread cutting signal of logic 0 is applied to one input of the gate 53 (switch 2). When the lathe spindle is in the proper position, the thread position synchronizer flip-flop FF2 is also placed in the set condition, and a logic 0 is applied to a second input of the gate 53 (switch 1). This same logic 0 is also applied to the gate 68 to unblock this gate 68 and allow pulses on the encoder signal bus 66 to pass through to the multiplier counters MC. Thus, the counters MC are synchronized with the thread position synchronizer 31 and provide an index of the lathe spindle position. After the lathe spindle has revolved one revolution, these counters MC have counted 10,000 pulses and the last stage of the counters provides an output pulse which is applied to the flip-flop FF5. It will be seen that the lathe spindle position can be synchronized with the counters MC after an initial start, or can be synchronized by the use of the synchronizer 31. The use of the counters MC enables an accuracy to one part in 10,000 if the spindle encoder remains mechanically engaged with the lathe spindle. The signal from the counters MC sets the flip-flop FF5 so that its output terminal 0 is at a logic 0. Thus, a logic 0 is applied to a third input of the gate 53 (switch 2). Thus, three of the inputs of the gate 53 are at a logic 0 so that signals on the encoder bus 66 may pass through the gate 53, this being switch 2. These signals pass through the gate 60 which is unblocked by a logic 0 at the output of the gate 54. The signals passing through the gate 60 are applied to the velocity command multiplier gates MG. The signals passing through the gate 53 are inverted by the inverter 59 and are applied to the function generator multiplier gates MG through either the gates 58, 50 or the gates 51, 50 depending on whether the first commanded digit is a zero. If the first digit is a zero, the flip-flop FF1 is set so that the gate 58 is blocked and the gate 51 is unblocked on every tenth pulse. If the first digit is not a zero, the flip-flop FF1 is reset so that the gate 58 is unblocked and the gate 51 is blocked. The gate 50 (switch 3) is unblocked since the output of the gate 55 is a logic 0 and the output of either the gate 58 or the gate 51 is at a logic 0. Thus, pulses are applied to the velocity command 24 and to the function generator 25, these pulses being at a rate determined by the lathe spindle encoder synchronized with pulses from the pulse rate divider 22.

If it is desired to retrace the thread, the tool may be moved back to its initial position, this being synchronized to make the initial proper cut as the result of the multiplier counter output applied to the flip-flop FF5. When a thread cut is started, a count is also started. If the spindle encoder is kept engaged with the lathe spindle, this count is continued from that initial start. Thus, each complete revolution of the lathe spindle and work is continuously counted so that the lathe carriage may be moved in and out of the thread cutting operation and still maintain precise synchronization with the lathe spindle and work. Each time a thread cutting operation is called for, the carriage and tool will hesitate until it receives a signal from the flip-flop FF5 to go ahead. This signal is synchronized with an initial position of the lathe spindle and work. If the spindle encoder must be disengaged from the lathe spindle for any reason, proper re-synchronization between the lathe carriage and the lathe spindle and work can be gotten by the thread position synchronizer 31.

If the first digit of the commanded thread lead is a zero, the flip-flop FF1 is set so that the gate 58 is blocked and so that the gate 51 is constantly unblocked by the flip-flop FF1 and unblocked for every tenth pulse by the 1 state of the multiplier counter MC. Thus, encoder pulses passing through the gate 53 and the inverter 59 may only pass through the gate 51 on every tenth such pulse.

If the threads are to have a variable lead, either increasing or decreasing, either of the gates 56, 57 may be unblocked to provide velocity command pulses to the function generator up counter UC or to the function generator down counter DC. These pulses appropriately change the lead programmed in the up or down counters UC or DC so that an increasing or decreasing number of pulses is provided by the function generator to cause an increasing or decreasing thread lead.

Normally, the lead screw will be controlled by the X axis, and hence this lead screw will be moved in accordance with the thread lead commanded information, such lead being constant or increasing or decreasing. If the thread diameter is changed, appropriate input information can be provided on the Y axis. Thus, it will be seen that threads of constant diameter with constant lead, increasing lead, or decreasing lead may be provided; or that threads of varying diameter with constant lead, increasing lead, or decreasing lead may be provided.

While the invention has been described with particular reference to thread cutting, the invention can also be used when it is desirable to cut material on a lathe at a constant or predetermined rate. That is, it may be desirable to cut a chip of constant or predetermined thickness from the work for all speeds of rotation of the work. This may be accomplished in accordance with the invention since the carriage motion is synchronized with the work rotation.

*Conclusion*

It will thus be seen that the invention provides a new and improved feature for use with numerical contouring control systems. Although a preferred embodiment utilizes logic and digital techniques such as shown in FIGURE 4, it is to be understood that other techniques for providing the operation may be achieved. This is indicated by the general switching arrangement shown in FIGURE 1. Therefore, while the invention has been described with reference to a particular embodiment, it is to be understood that modifications may be made without departing from the spirit of the invention or from the scope of the claims.

What I claim as new and desire to secure by Letters Patent of the United States is:

1. In a system for controlling the relative movement of two objects wherein pulses are provided by a velocity command device, and said provided pulses are applied to a function generator which modifies said pulses, the improvement comprising a first generator for producing first pulses at a rate proportional to the rotational speed of one of said objects, and means for selectively applying said first pulses to said function generator whereby said system receives pulses at a rate indicative of said rotational speed of said one object.

2. In a system for controlling the movement of a movable tool relative to a rotating workpiece wherein pulses are produced by a system generator, said generated pulses are applied to a velocity command device which, in response to input data, can modify said pulses to control the speed of movement of said tool, and said modified pulses are applied to a function generator which, in response to input data, can further modify said pulses to control the movement of said tool, the improvement comprising a first generator for producing first pulses at a rate indicative of the rotational speed of said workpiece, and means for selectively applying said first pulses to said function generator whereby said system receives pulses and moves said tool at a speed indicative of the rotational speed of said workpiece.

3. In a system for controlling the movement of a movable tool relative to a rotating workpiece wherein pulses are produced by a system generator, said generated pulses are applied to a velocity command device which, in response to input data, can modify the rate of said pulses to control the speed of movement of said tool, and said modified pulses are applied to a function generator which, in response to input data, can further modify said pulses to control the movement of said tool, the improvement comprising a first generator for producing first pulses at a rate indicative of the rotational speed of said workpiece, and means for selectively removing said generated pulses from said command device and applying said first pulses to said function generator whereby said system receives pulses and moves said tool at a speed indicative of the rotational speed of said workpiece.

4. In a system for controlling the movement of a movable tool relative to a rotating workpiece wherein pulses are produced by a system generator, said generated pulses are applied to a velocity command device which, in response to input data, can modify the rate of said pulses for controlling the speed of movement of said tool, and said pulses from said velocity command are applied to a function generator which, in response to input data, can resolve said pulses into one or more components for movement of said tool in one or more directions, the improvement comprising a first generator for producing first pulses at a rate indicative of the rotational speed of said workpiece, synchronizing means for rendering said first generator operable in response to a predetermined rotational position of said workpiece, and operable means for selectively coupling said function generator to said first generator and to said system generator.

5. In a system for controlling the movement of a movable tool relative to a rotating workpiece wherein pulses are produced by a system generator, said generated pulses are applied to a velocity command device which, in response to input data, can modify the rate of said pulses for controlling the speed of movement of said tool, and said pulses from said velocity command are applied to a function generator which, in response to input data, can resolve said pulses into one or more components for movement of said tool in one or more directions, the improvement comprising a first generator for producing first pulses at a rate indicative of the rotational speed of said workpiece, first operable means coupled to said first generator, synchronizing means for operating said first operable means in response to a predetermined rotational position of said workpiece, and second operable means for alternatively coupling said function generator to said first operable means and to said system generator.

6. In a system for controlling the movement of a movable tool relative to a rotating workpiece wherein pulses are produced by a system generator, said generated pulses are applied to a velocity command device which, in response to input data, can modify the rate of said pulses for controlling the speed of movement of said tool, and said pulses from said velocity command are applied to a function generator which, in response to input data, can resolve said pulses into one or more components for movement of said tool in one or more directions, a thread cutting improvement comprising a first generator for producing first pulses at a rate indicative of the rotational speed of said workpiece, synchronizing means for rendering said first generator operable in response to a predetermined rotational position of said workpiece, first operable means for selectively coupling said function generator to said first generator and to said velocity command device, and second operable means for selectively coupling said velocity command device to said first generator and to said system generator.

7. In a system for controlling the movement of a movable tool relative to a rotating workpiece wherein pulses are produced by a system generator, said generated pulses are applied to a velocity command device which, in response to input data, can modify the rate of said pulses for controlling the speed of movement of said tool, and said pulses from said velocity command are applied to a function generator which, in response to input data, can resolve said pulses into one or more components for movement of said tool in one or more directions, a thread cutting improvement comprising a first generator for producing first pulses at a rate indicative of the rotational speed of said workpiece, first operable means coupled to said first generator, synchronizing means for operating said first operable means in response to a predetermined rotational position of said workpiece, second operable means for alternatively coupling said function generator to said first operable means and to said velocity command device, and third operable means for alternatively coupling said velocity command device to said first operable means and to said system generator.

8. In a system for controlling the movement of a movable tool relative to a rotating workpiece wherein pulses are produced by a system generator, said generated pulses are applied to a velocity command device which, in response to input data, can modify the rate of said pulses for controlling the speed of movement of said tool, and said pulses from said velocity command are applied to a function generator which, in response to input data, can resolve said pulses into one or more components for movement of said tool in one or more directions, a thread cutting improvement comprising a first generator for producing first pulses at a rate indicative of the rotational speed of said workpiece, first operable means coupled to said first generator, synchronizing means for operating said first operable means in response to a predetermined rotational position of said workpiece, second operable means for alternatively coupling said function generator to said first operable means and to said system generator, and means responsive to an input signal for operating said second operable means, thereby coupling said function generator to said first operable means, and thereby de-coupling said function generator from said system generator.

9. In a system for controlling the movement of a movable tool relative to a rotating workpiece wherein pulses are produced by a system generator, said generated pulses are applied to a velocity command device which, in response to input data, can modify the rate of said pulses for controlling the speed of movement of said tool, and said pulses from said velocity command are applied to a function generator which, in response to input data, can resolve said pulses into one or more components for movement of said tool in one or more directions, a thread cutting improvement comprising a first generator for producing first pulses at a rate indicative of the rotational speed of said workpiece, first operable means coupled to said first generator, synchronizing means for operating said first operable means in response to a predetermined rotational position of said workpiece, second operable means for alternatively coupling said function generator to said first operable means and to said velocity command device, third operable means for alternatively coupling said velocity command device to said first operable means and to said system generator, and means responsive to an input signal for operating said second and third operable means, thereby coupling both said velocity command device and said function generator to said first operable means, and thereby de-coupling said velocity command device from said system generator and decoupling said function generator from said velocity command device.

10. The thread cutting improvement defined in claim 7, and further including fourth operable means for selectively coupling pulses from said velocity command device in one of two selectable senses.

11. The thread cutting improvement defined in claim 7, and further including fourth operable means for reducing the rate of said first pulses by a predetermined amount in response to input data calling for predetermined thread leads.

12. In a system for controlling the movement of a movable tool relative to a rotating workpiece wherein pulses are produced by a system generator, said generated pulses are applied to a velocity command device which, in response to input data, can modify the rate of said pulses for controlling the speed of movement of said tool, and said pulses from said velocity command are applied to a function generator which, in response to input data, can resolve said pulses into one or more components for movement of said tool in one or more directions, a thread cutting improvement comprising a first generator for producing first pulses at a rate indicative of the rotational speed of said workpiece, first operable means coupled to said first generator, synchronizing means for operating said first operable means in response to a predetermined rotational position of said workpiece, second operable means for alternatively coupling said function generator to said first operable means and to said velocity command device, third operable means for alternatively coupling said velocity command device to said first operable means and to said system generator, means responsive to an input signal for operating said second and third operable means, thereby coupling both said velocity command device and said function generator to said first operable means, and thereby de-coupling said velocity command device from said system generator and de-coupling said function generator from said velocity command device, and means responsive to an input signal for coupling pulses from said velocity command to said function generator in one of two selectable senses to provide a varied rate of movement of said tool relative to said workpiece.

13. In a system for controlling the movement of a movable tool relative to a rotating workpiece wherein pulses are produced by a system generator, said generated pulses are applied to a velocity command device which, in response to input data, can modify the rate of said pulses for controlling the speed of movement of said tool, and said pulses from said velocity command are applied to a function generator which, in response to input data, can resolve said pulses into one or more components for movement of said tool in one or more directions, a thread cutting improvement comprising a first generator for producing first pulses at a rate indicative of the rotational speed of said workpiece, first operable means coupled to said first generator, synchronizing means for operating said first operable means in response to a predetermined rotational position of said workpiece, second operable means for alternatively coupling said function generator to said first operable means and to said velocity command device, third operable means for alternatively coupling said velocity command device to said first operable means and to said system generator, means responsive to an input signal for operating said second and third operable means, thereby coupling both said velocity command device and said function generator to said first operable means, and thereby de-coupling said velocity command device from said system generator and de-coupling said function generator from said velocity command device, and means responsive to an input signal for reducing the rate of said first pulses by a predetermined amount.

14. In a system for controlling the movement of a movable tool relative to a rotating workpiece wherein pulses are produced by a system generator, said generated pulses are applied to a velocity command device which, in response to input data, can modify the rate of said pulses for controlling the speed of movement of said tool, and said pulses from said velocity command are applied to a function generator which, in response to input data, can resolve said pulses into one or more components for movement of said tool in one or more directions, a thread cutting improvement comprising a first generator for producing first pulses at a rate indicative of the rotational speed of said workpiece, first operable means coupled to said first generator, synchronizing means for operating said first operable means in response to a predetermined rotational position of said workpiece, second operable means for alternatively coupling said function generator to said first operable means and to said velocity command device, third operable means for alternatively coupling said velocity command device to said first operable means and to said system generator, means responsive to an input signal for operating said second and third operable means, thereby coupling both said velocity command device and said function generator to said first operable means, and thereby de-coupling said velocity command device from said system generator and de-coupling said function generator from said velocity command device, means responsive to an input signal for coupling pulses from said velocity command to said function generator in one of two selectable senses to provide a varied rate of movement of said tool relative to said workpiece, and means responsive to an input signal for reducing the rate of said first pulses by a predetermined amount.

References Cited in the file of this patent

UNITED STATES PATENTS

| 3,002,115 | Johnson et al. | Sept. 26, 1961 |
| 3,015,806 | An Wang et al. | Jan. 2, 1962 |
| 3,096,608 | Forrester et al. | Dec. 18, 1962 |